United States Patent
Ogiwara

(10) Patent No.: US 8,442,404 B2
(45) Date of Patent: May 14, 2013

(54) OPTICAL DISPERSION COMPENSATOR, OPTICAL TRANSMISSION APPARATUS, OPTICAL TRANSMISSION SYSTEM, AND METHOD THEREOF

(75) Inventor: Hiroshi Ogiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 279 days.

(21) Appl. No.: 12/730,698

(22) Filed: Mar. 24, 2010

(65) Prior Publication Data

US 2010/0247110 A1    Sep. 30, 2010

(30) Foreign Application Priority Data

Mar. 27, 2009 (JP) ................................. 2009-080131

(51) Int. Cl.
*H04B 10/12* (2006.01)

(52) U.S. Cl.
USPC ............. 398/147; 398/158; 398/159; 398/81; 398/148; 398/149; 359/337; 359/341.1; 385/24; 385/37; 385/11

(58) Field of Classification Search .................. 398/147, 398/158, 159, 160, 81, 79, 33, 38, 148, 149, 398/173, 174, 175, 176, 180, 181; 359/341.1, 359/337, 349, 337.5; 385/24, 37, 11
See application file for complete search history.

(56) References Cited

U.S. PATENT DOCUMENTS

| | | | |
|---|---|---|---|
| 6,018,404 A | | 1/2000 | Meli et al. |
| 6,157,477 A | * | 12/2000 | Robinson ....................... 398/147 |
| 6,278,536 B1 | | 8/2001 | Kai et al. |
| 6,480,312 B1 | * | 11/2002 | Okuno et al. ................. 398/158 |
| 6,704,517 B1 | * | 3/2004 | Gaubatz ........................ 398/147 |
| 6,768,578 B1 | | 7/2004 | Kinoshita et al. |
| 6,891,663 B2 | | 5/2005 | Kinoshita et al. |
| 6,943,940 B2 | | 9/2005 | Kinoshita et al. |
| 2002/0118446 A1 | | 8/2002 | Lee et al. |
| 2004/0184813 A1 | * | 9/2004 | Mikami ......................... 398/147 |
| 2007/0147840 A1 | * | 6/2007 | Sugawara et al. ............... 398/81 |
| 2007/0177877 A1 | * | 8/2007 | Sekine ........................... 398/147 |

FOREIGN PATENT DOCUMENTS

| | | |
|---|---|---|
| JP | 8-265272 | 10/1996 |
| JP | 11-127121 | 5/1999 |
| JP | 11-177493 | 7/1999 |
| JP | 2000-78081 | 3/2000 |
| JP | 2002-319902 | 10/2002 |

* cited by examiner

*Primary Examiner* — Hanh Phan
(74) *Attorney, Agent, or Firm* — Staas & Halsey LLP

(57) ABSTRACT

An optical dispersion compensator including a first optical device in which light inputted from a first port is outputted from a second port and light inputted from the second port is outputted from a third port, an optical filter type dispersion compensation device that receives light from the second port of the first optical device and compensates wavelength dispersion with respect to the received light, and a second optical device that includes a fourth port to which light is inputted from the optical filter type dispersion compensation device, and in which the light inputted from the fourth port is outputted from a fifth port and light inputted from a sixth port is outputted from the fourth port.

19 Claims, 16 Drawing Sheets

OPTICAL DISPERSION COMPENSATOR, OPTICAL TRANSMISSION APPARATUS, OPTICAL TRANSMISSION SYSTEM, AND METHOD THEREOF

CROSS-REFERENCE TO RELATED APPLICATIONS

This application is based upon and claims the benefit of priority of the prior Japanese Patent Application No. 2009-080131, filed on Mar. 27, 2009, the entire contents of which are incorporated herein by reference.

BACKGROUND

1. Field

The embodiments discussed herein are related to an optical (or wavelength) dispersion compensator, an optical transmission apparatus, an optical transmission system, and method of controlling same.

2. Description of the Related Art

In a related art, a transmission apparatus performs bidirectional optical communication by transmitting optical signals having wavelengths that are different between in an upstream direction and a downstream direction. There is a general optical transmission apparatus that performs bidirectional wavelength division multiplexing (WDM) optical communication by unifying transmission paths for bidirectionally-transmitted optical signals into one direction by using a multiplexer. Japanese Laid-open Patent Publication No. 11-127121 discusses such an optical transmission apparatus that includes, for example, a collective dispersion compensation unit that collectively compensates dispersion of each of optical signals having wavelengths that are different between in an upstream direction and a downstream direction which are unified into one direction.

And, Japanese Laid-open Patent Publication No. 2000-78081 discusses an apparatus that enables compensation of optical (wavelength) dispersion with respect to wide-band WDM signal light. For example, this document discusses an optical amplifier in which: wavelength-multiplexed signal light is demultiplexed and sent to an optical fiber amplification unit for each wavelength band; and the signal light of each wavelength band which has passed through a corresponding variable optical attenuator, is multiplexed once and sent to a dispersion compensation fiber (DCF) to collectively perform dispersion compensation with respect to each wavelength band.

SUMMARY

According to an aspect of the invention, an optical dispersion compensator including a first optical device in which light inputted from a first port is outputted from a second port and light inputted from the second port is outputted from a third port, an optical filter type dispersion compensation device that receives light from the second port of the first optical device and compensates wavelength dispersion with respect to the received light, and a second optical device that includes a fourth port to which light is inputted from the optical filter type dispersion compensation device, and in which the light inputted from the fourth port is outputted from a fifth port and light inputted from a sixth port is outputted from the fourth port.

According to another aspect of the invention, an optical transmission apparatus including: a first optical device in which light inputted from a first port is outputted from a second port and light inputted from the second port is outputted from a third port, an optical filter type dispersion compensation device that receives light from the second port of the first optical device and compensates wavelength dispersion with respect to the received light, a second optical device that includes a fourth port to which light is inputted from the optical filter type dispersion compensation device, and in which the light inputted from the fourth port is outputted from a fifth port and light inputted from a sixth port is outputted from the fourth port, an optical sender that outputs light to the first port of the first optical device, and an optical receiver that receives light from the third port of the first optical device.

According to another aspect of the invention, an optical transmission system including: a first optical transmission apparatus that outputs light, a second optical transmission apparatus that outputs light having a wavelength that is the same as a wavelength of the light outputted from the first optical transmission apparatus, a first optical transmission line that transmits the light outputted from the first optical transmission apparatus, to the second optical transmission apparatus; and a second optical transmission line that transmits the light outputted from the second optical transmission apparatus, to the first optical transmission apparatus, where one, or each of the first optical transmission apparatus and the second optical transmission apparatus includes a first optical device in which light inputted from a first port is outputted from a second port and light inputted from the second port is outputted from a third port; an optical filter type dispersion compensation device that receives light from the second port of the first optical device and compensates wavelength dispersion with respect to the received light, a second optical device that includes a fourth port to which light is inputted from the optical filter type dispersion compensation device, and in which the light inputted from the fourth port is outputted from a fifth port and light inputted from a sixth port is outputted from the fourth port, an optical sender that outputs light to the first port of the first optical device, and an optical receiver that receives light from the third port of the first optical device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
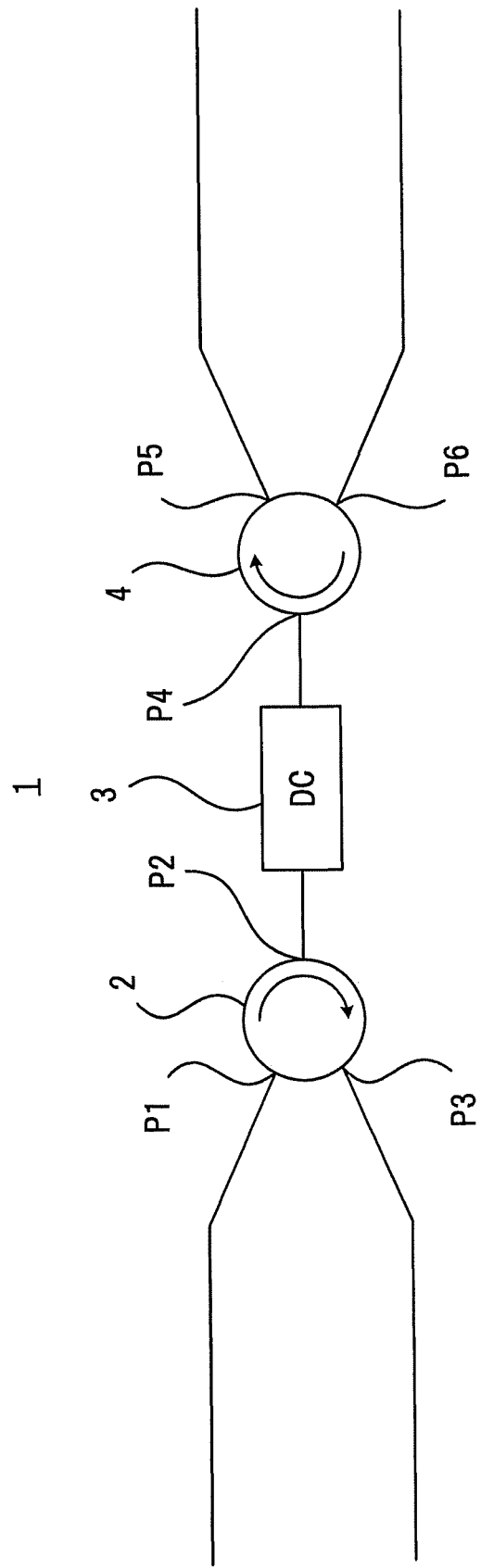
FIG. 1 illustrates a first example of an optical dispersion compensator according to an embodiment.

Reference will now be made in detail to the embodiments, examples of which are illustrated in the accompanying drawings, wherein like reference numerals refer to the like elements throughout. The embodiments are described below to explain the present invention by referring to the figures.

In a related art, when input/output directions of light are not unified in an upstream direction and a downstream direction, there is a problem that wavelength dispersion of light in the upstream direction and wavelength dispersion of light in the downstream direction may not be compensated by a single optical (wavelength) dispersion compensator. Further, when the wavelengths of lights in the upstream direction and the downstream direction are the same, there is a problem that wavelength dispersion of the light in the upstream direction and that of the light in the downstream direction may not be compensated by a single optical dispersion compensator. In addition, wavelength bands are separated such that bands are assigned as guard bands, and hence there is a problem that it is difficult to compensate wavelength dispersion with respect to a continuous band. Further, a dispersion compensation fiber has a characteristic of having a great insertion loss and a characteristic that light returning in the reverse direction is likely to occur due to Rayleigh scattering. Therefore, in a configuration in which a dispersion compensation fiber is used, when the wavelengths of the lights in the upstream direction and the downstream direction are the same, there is a problem that signal quality deteriorates because coherent crosstalk occurs.

Hereinafter, embodiments of this optical dispersion compensator, an optical transmission apparatus, an optical transmission system, and method thereof will be described in detail with reference to the drawings. In each embodiment described below, the same components are designated by the same reference characters, and the overlap description is omitted.

FIG. 1 illustrates a first example of an optical dispersion compensator according to an embodiment. As shown in FIG. 1, an optical dispersion compensator 1 of the first example includes a first optical device 2, an optical filter type dispersion compensation device 3, and a second optical device 4. The first optical device 2 has a first port P1, a second port P2, and a third port P3. Light inputted from the first port P1 is outputted from the second port P2. Light inputted from the second port P2 is outputted from the third port P3. The second port P2 is substantially connected to the optical filter type dispersion compensation device 3. For example, an optical circulator may be used as the first optical device 2.

The second optical device 4 has a fourth port P4, a fifth port P5, and a sixth port P6. Light inputted from the fourth port P4 is outputted from the fifth port P5. Light inputted from the sixth port P6 is outputted from the fourth port P4. The fourth port P4 is substantially connected to the optical filter type dispersion compensation device 3. For example, an optical circulator may be used as the second optical device 4.

The optical filter type dispersion compensation device 3 has, for example, two ports. One of the ports is substantially connected to the second port P2 of the first optical device 2. The other port is substantially connected to the fourth port P4 of the second optical device 4. The optical filter type dispersion compensation device 3 compensates wavelength dispersion with respect to light that is inputted from the second port P2 of the first optical device 2 and outputted to the fourth port P4 of the second optical device 4. The optical filter type dispersion compensation device 3 also compensates wavelength dispersion with respect to light that is inputted from the fourth port P4 of the second optical device 4 and outputted to the second port P2 of the first optical device 2. The optical filter type dispersion compensation device 3 may have a characteristic of having a low loss and low reflection. For example, an etalon (interference filter) type dispersion compensator may be used as the optical filter type dispersion compensation device 3. In general, an etalon (interference filter) type dispersion compensator has a loss of −5 dB or less and a return loss of −45 dB or less.

In such a configuration, assuming a path A, on which light travels through the first port P1 of the first optical device 2, the second port P2 of the first optical device 2, the optical filter type dispersion compensation device 3, the fourth port P4 of the second optical device 4, and the fifth port P5 of the second optical device 4. In addition, assuming a path B, on which light travels through the sixth port P6 of the second optical device 4, the fourth port P4 of the second optical device 4, the optical filter type dispersion compensation device 3, the second port P2 of the first optical device 2, and the third port P3 of the first optical device 2.

A part of light that travels on the path A may be reflected by the optical filter type dispersion compensation device 3 and may return to the second port P2 of the first optical device 2. However, due to the low reflection characteristic of the optical filter type dispersion compensation device 3, generally a level of the light returning from the optical filter type dispersion compensation device 3 is low. In addition, a part of the light that travels on the path A may be reflected at a position ahead of the second optical device 4 (on the right side in FIG. 1) due to Rayleigh scattering or another effect, and may return to the fifth port P5 of the second optical device 4. The second optical device 4 suppresses the level of light outputted from the fifth port P5 to the fourth port P4 (return light of the light that travels on the path A), to a level that does not have an adverse effect on the signal quality of light that travels on the path B, namely, light that should be outputted from the sixth port P6 to the fourth port P4. Thus, coherent crosstalk of the path B is suppressed.

The same is true for coherent crosstalk of the path A. A part of light that travels on the path B may be reflected by the optical filter type dispersion compensation device 3 and may return to the fourth port P4 of the second optical device 4. However, generally a level of the light returning from the optical filter type dispersion compensation device 3 is sufficiently low. In addition, a part of the light that travels on the path B may be reflected at a position ahead of the first optical device 2 (on the left side in FIG. 1) and may return to the third port P3 of the first optical device 2. The first optical device 2 suppresses the level of light outputted from the third port P3 to the second port P2 (return light of the light that travels on the path B), to a level that does not have an adverse effect on the signal quality of light that travels on the path A, namely, light that should be outputted from the first port P1 to the second port P2. Thus, the coherent crosstalk of the path A is suppressed.

For each of the path A and the path B, one example of a crosstalk amount is shown. An optical input power of the path A is indicated by PsigA (dBm) and an optical input power of the path B is indicated by PsigB (dBm). Each of losses Lcir of the optical circulators (the first optical device 2 and the second optical device 4) is, for example, −1 dB; a loss Ldc of the dispersion compensator (the optical filter type dispersion compensation device 3) is, for example, −5 dB; each of directivities Rcir of the optical circulators (the first optical device 2 and the second optical device 4) is, for example, −50 dB; and a return loss Rdc of the dispersion compensator (the optical filter type dispersion compensation device 3) is −45 dB.

In this case, the crosstalk amount of the path A is represented by the following formula (1), and the crosstalk amount of the path B is represented by the following formula (2).

$$\text{Path } A \text{ crosstalk amount} = -((PsigA + Lcir \times 2 + Ldc) - (PsigB + 10 \cdot \log(10^{(Rcir/10)} + 10^{((Rdc + Lcir \times 2)/10)}))) \quad (1)$$

$$\text{Path } B \text{ crosstalk amount} = -((PsigB + Lcir \times 2 + Ldc) - (PsigA + 10 \cdot \log(10^{(Rcir/10)} + 10^{((Rdc + Lcir \times 2)/10)}))) \quad (2)$$

When: PsigA=PsigB; and the above values are assigned to the above formulas (1) and (2), the following formulas (3) and (4) are obtained.

$$\text{Path } A \text{ crosstalk amount} = -((-1 \times 2 - 5) - (10 \cdot \log(10^{(-50/10)} + 10^{(-47/10)}))) = -38.2 \text{ [dB]} \quad (3)$$

$$\text{Path } B \text{ crosstalk amount} = -((-1 \times 2 - 5) - (10 \cdot \log(10^{(-50/10)} + 10^{(-47/10)}))) = -38.2 \text{ [dB]} \quad (4)$$

In general, when a coherent crosstalk exceeds −25 dB, deterioration of signal quality appears markedly. Thus, in order that the coherent crosstalk does not have an adverse effect on the signal quality, in an embodiment, the coherent crosstalk is suppressed so as to be −28 dB or less on the light transmitting side and the light receiving side. With reference to the above formulas (3) and (4), both of the crosstalk amounts of the path A and the path B are −38.2 dB, and hence are sufficiently lower than −28 dB. In this manner, an effect is provided, that wavelength dispersion with respect to both the light in the upstream direction and the light in the downstream direction may be compensated by the single optical dispersion compensator such that the coherent crosstalk does not have an adverse effect on the signal quality.

Figure 2:
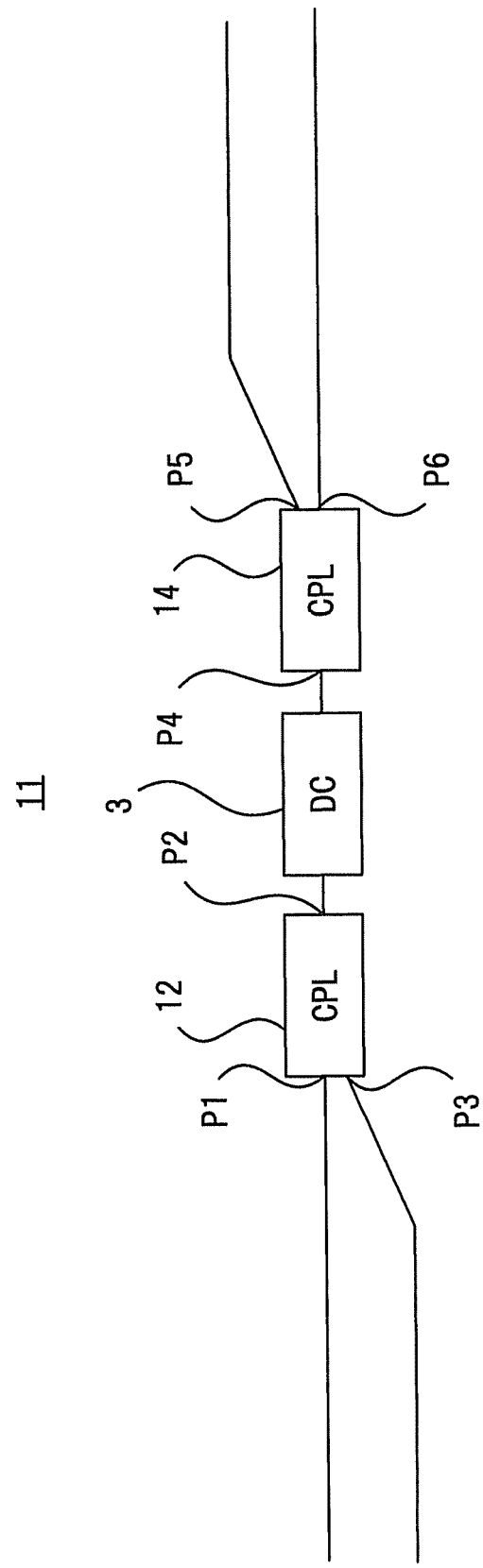
FIG. 2 illustrates a second example of the optical dispersion compensator according to an embodiment.

FIG. 2 illustrates a second example of the optical dispersion compensator according to an embodiment. As shown in FIG. 2, an optical dispersion compensator 11 of the second example is an optical dispersion compensator in which optical couplers (CPL) are used as a first optical device 12 and a second optical device 14 in the first example of the optical dispersion compensator. In each of the optical couplers that are the first optical device 12 and the second optical device 14, the symbols of the ports P1 to P6 and the directions of the paths A and B on which light travels are the same as those in the first example of the optical dispersion compensator.

For each of the path A and the path B, one example of a crosstalk amount is set forth below. For the first optical coupler (the first optical device 12), a through loss Lcpl1_th is, for example, −3 dB, and a cross loss Lcpl1_x is, for example, $10 \cdot \log(1 - 10^{(Lcpl1\_th/10)})$. For the second optical coupler (the second optical device 14), a through loss Lcpl2_th is, for example, −3 dB, and a cross loss Lcpl2_x is, for example, $10 \cdot \log(1 - 10^{(Lcp21\_th/10)})$. Each of directivities Rcpl of the optical couplers (the first optical device 12 and the second optical device 14) is −50 dB. The symbol of each of the optical input powers of the path A and the path B, and the loss Ldc and the return loss Rdc of the dispersion compensator (the optical filter type dispersion compensation device 3) are the same as those in the aforementioned first example of the optical dispersion compensator.

In this case, the crosstalk amount of the path A is represented by the following formula (5), and the crosstalk amount of the path B is represented by the following formula (6).

$$\text{Path } A \text{ crosstalk amount} = -((PsigA + Lcpl1\_th + Ldc + Lcpl2\_x) - (PsigB + 10 \cdot \log(10^{(Rcpl/10)} + 10^{((Lcpl2\_th + Rdc + Lcpl2\_x)/10)}))) \quad (5)$$

$$\text{Path } B \text{ crosstalk amount} = -((PsigB + Lcpl2\_th + Ldc + Lcpl1\_x) - (PsigA + 10 \cdot \log(10^{(Rcpl/10)} + 10^{((Lcpl1\_th + Rdc + Lcpl1\_x)/10)}))) \quad (6)$$

When: PsigA=PsigB; and the above values are assigned to the above formulas (5) and (6), the following formulas (7) and (8) are obtained. With reference to these formulas (7) and (8), both of the crosstalk amounts of the path A and the Path B are −36.5 dB, and hence are sufficiently lower than −28 dB.

$$\text{Path } A \text{ crosstalk amount} = -((-3-5-3) - (10 \cdot \log(10^{(-50/10)} + 10^{(-51/10)}))) = -36.5 \text{ [dB]} \quad (7)$$

$$\text{Path } B \text{ crosstalk amount} = -((-3-5-3) - (10 \cdot \log(10^{(-50/10)} + 10^{(-51/10)}))) = -36.5 \text{ [dB]} \quad (8)$$

Figure 3:
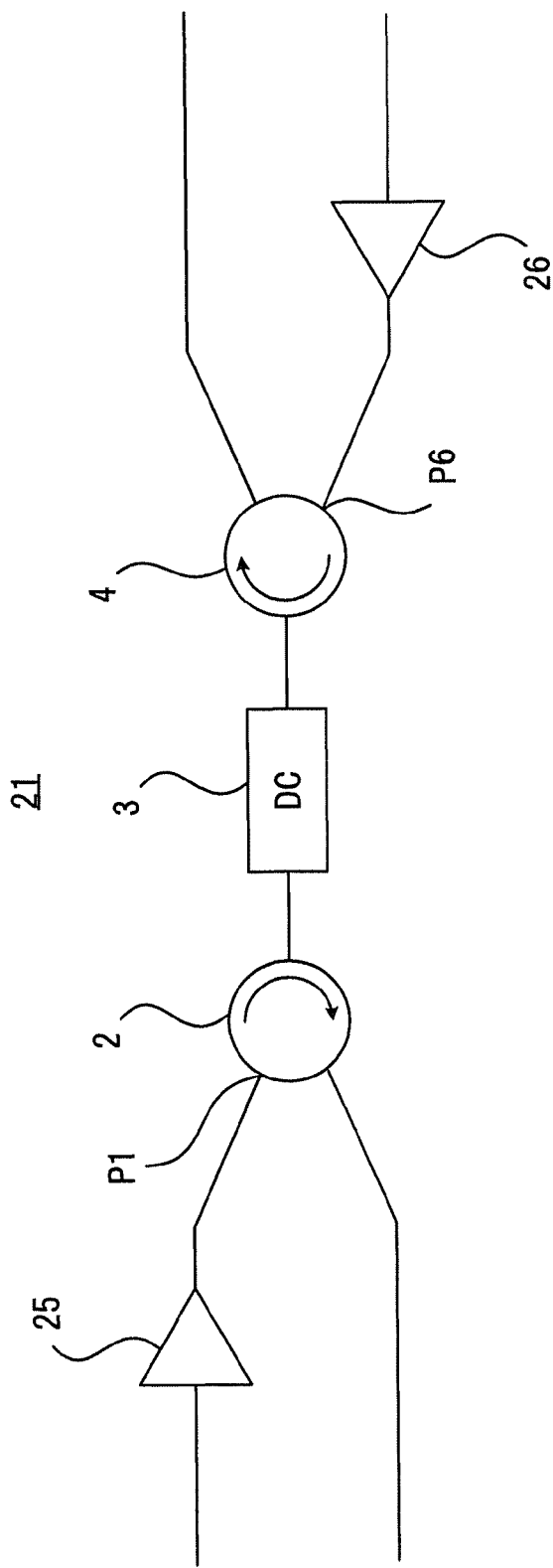
FIG. 3 illustrates a third example of the optical dispersion compensator according to an embodiment.

FIG. 3 illustrates a third example of the optical dispersion compensator according to an embodiment. As shown in FIG. 3, an optical dispersion compensator 21 of the third example is an optical dispersion compensator in which adjustment units 25 and 26 for adjusting the input level of light to be inputted to the optical filter type dispersion compensation device 3 are added to the first example of the optical dispersion compensator. For example, the first adjustment unit 25 is substantially connected to the first port P1 of the first optical device 2. For example, an optical amplifier may be used as the first adjustment unit 25. For example, the second adjustment unit 26 is substantially connected to the sixth port P6 of the second optical device 4. For example, an optical amplifier may be used as the second adjustment unit 26. The level of input signal light on the path A may be substantially equalized with the level of input signal light on the path B by the adjustment units 25 and 26. By so doing, the crosstalk is appropriately suppressed.

Figure 4:
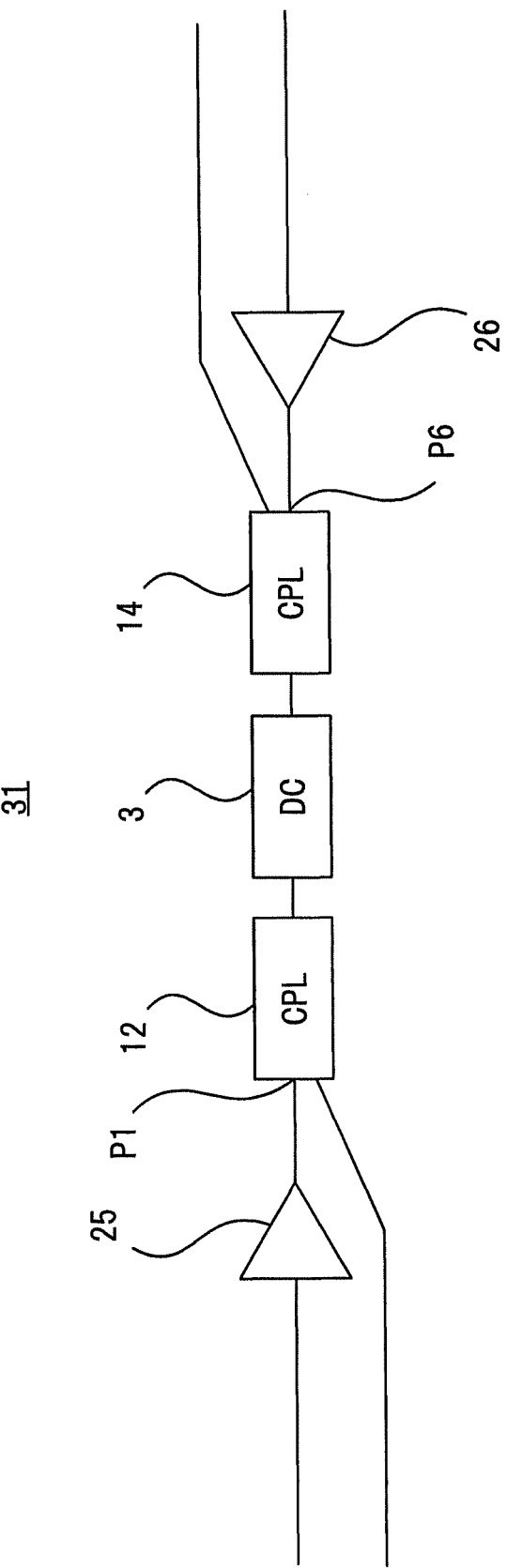
FIG. 4 illustrates a fourth example of the optical dispersion compensator according to an embodiment.

FIG. 4 illustrates a fourth example of the optical dispersion compensator according to an embodiment. As shown in FIG. 4, an optical dispersion compensator 31 of the fourth example is an optical dispersion compensator in which the adjustment units 25 and 26 are added to the second example of the optical dispersion compensator, similarly as in the third example. The level of input signal light on the path A may be substantially equalized with the level of input signal light on the path B by the adjustment units 25 and 26, and thus the crosstalk is appropriately suppressed. It is noted that, in the third example or the fourth example, only one of the first adjustment unit 25 and the second adjustment unit 26 may be provided.

Figure 5:
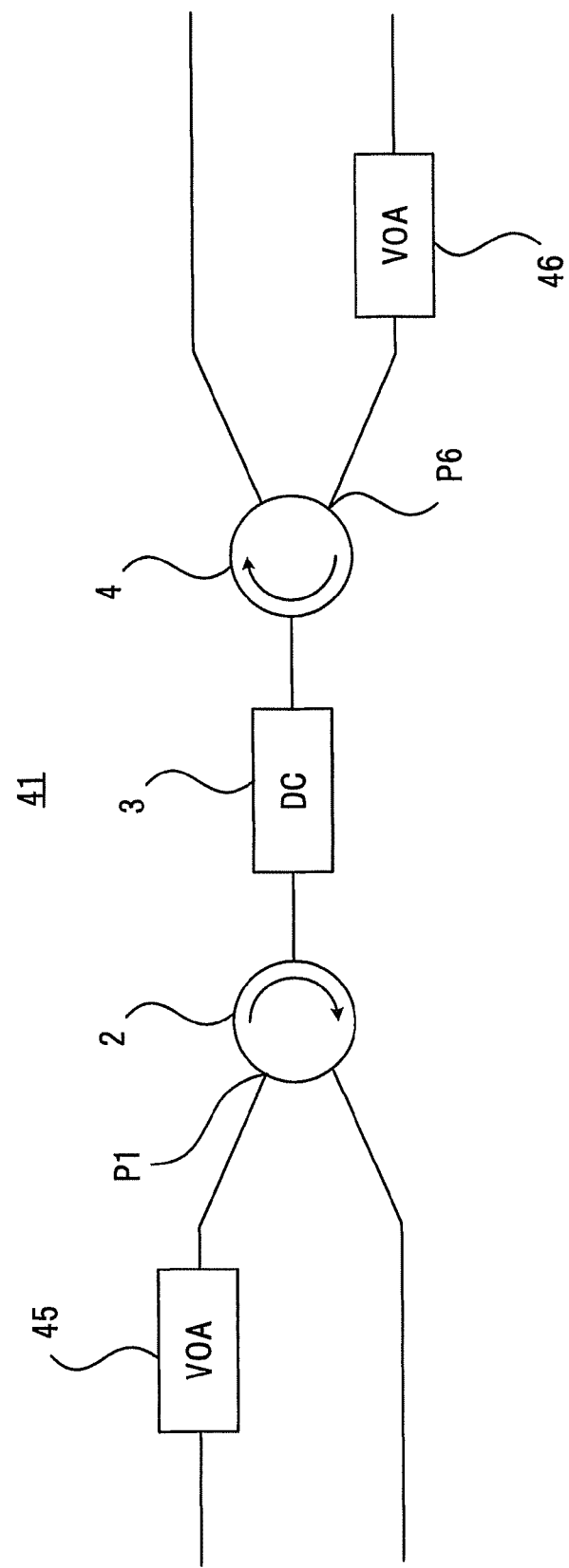
FIG. 5 illustrates a fifth example of the optical dispersion compensator according to an embodiment.

FIG. 5 illustrates a fifth example of the optical dispersion compensator according to an embodiment. As shown in FIG.

5, an optical dispersion compensator 41 of the fifth example is an optical dispersion compensator in which variable optical attenuators (VOA) are used as a first adjustment unit 45 and a second adjustment unit 46 in the third example of the optical dispersion compensator. The level of input signal light on the path A may be substantially equalized with the level of input signal light on the path B by the adjustment units 45 and 46, and thus the crosstalk is appropriately suppressed.

Figure 6:
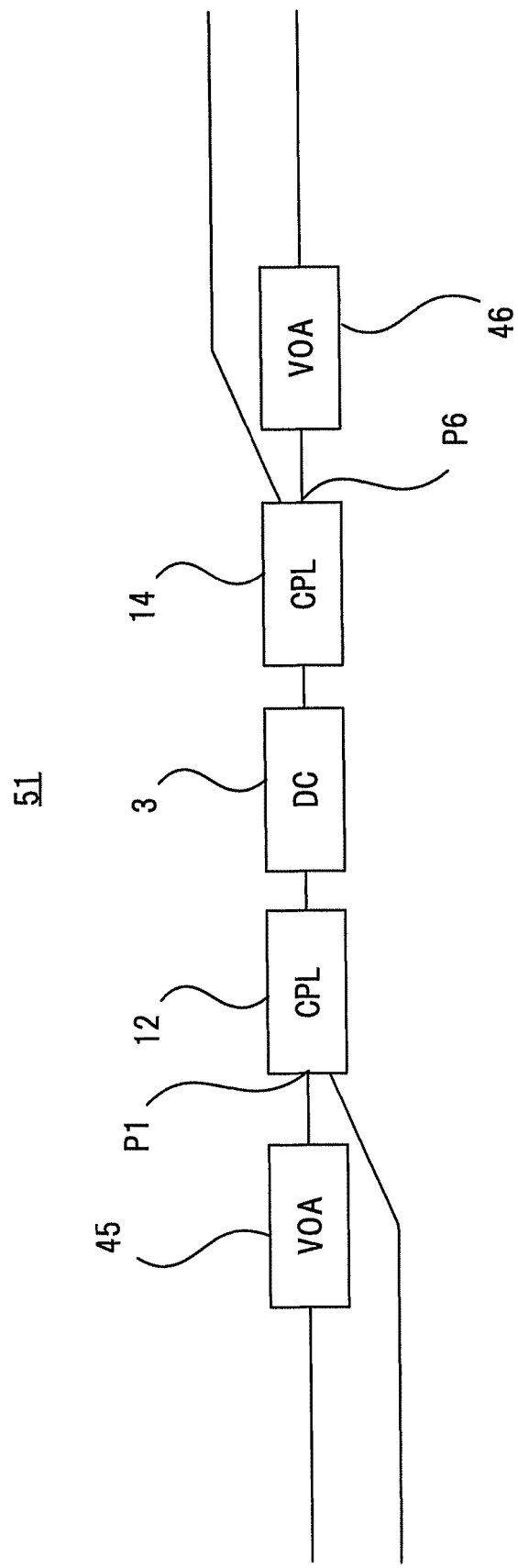
FIG. 6 illustrates a sixth example of the optical dispersion compensator according to an embodiment.

FIG. 6 illustrates a sixth example of the optical dispersion compensator according to an embodiment. As shown in FIG. 6, an optical dispersion compensator 51 of the sixth example is an optical dispersion compensator in which variable optical attenuators are used as the first adjustment unit 45 and the second adjustment unit 46 in the fourth example of the optical dispersion compensator, similarly as in the fifth example. The level of input signal light on the path A may be substantially equalized with the level of input signal light on the path B by the adjustment units 45 and 46, and thus the crosstalk is appropriately suppressed. It is noted that, in the fifth example or the sixth example, only one of the first adjustment unit 45 and the second adjustment unit 46 may be provided, or one of them may be an optical amplifier.

According to an embodiment, the optical filter type dispersion compensation device 3 compensates wavelength dispersion with respect to the light inputted from the first optical device 2 or 12, and also compensates wavelength dispersion with respect to the light inputted from the second optical device 4 or 14. Thus, the wavelength dispersion with respect to both the light on the path A and the light on the path B may be compensated by the single optical dispersion compensator 1, 11, 21, 31, 41, or 51. Therefore, the number of parts necessary is reduced and the optical dispersion compensator becomes inexpensive. Further, because the crosstalk may be sufficiently suppressed, the optical dispersion compensator may be shared for both to-be-received light and to-be-transmitted light, even when the to-be-received light and the to-be-transmitted light have the same wavelength. Further, the optical dispersion compensator may be reduced in size. In the first to sixth examples, the optical dispersion compensator may have a function of changing a dispersion value.

Figure 7:
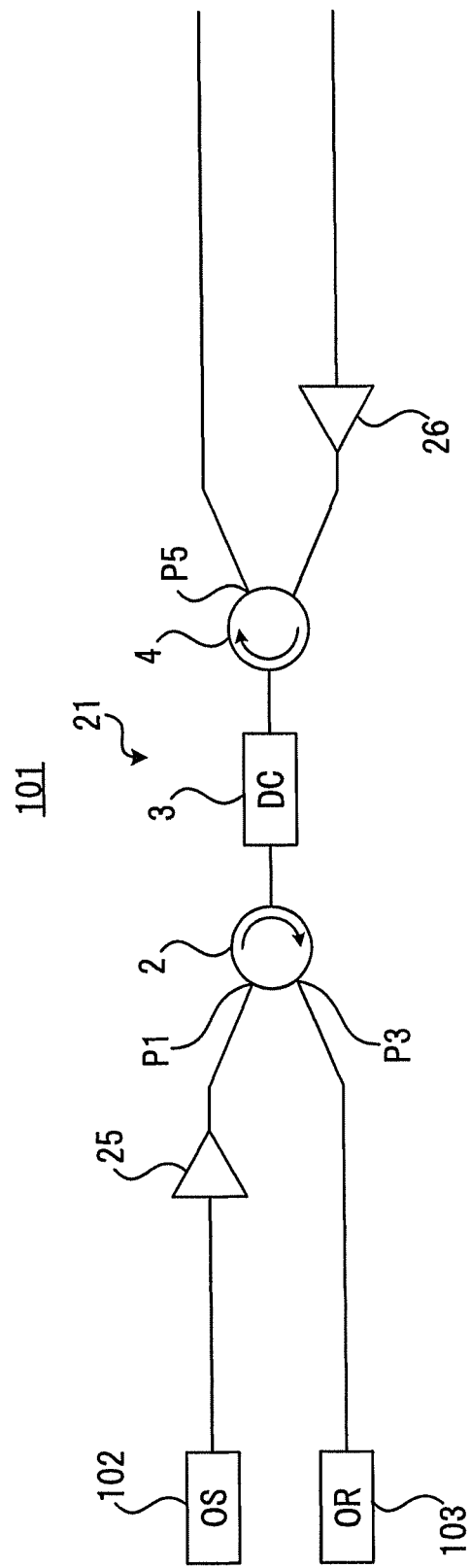
FIG. 7 illustrates a first example of an optical transmission apparatus according to an embodiment.

FIG. 7 illustrates a first example of an optical transmission apparatus according to another embodiment. As shown in FIG. 7, an optical transmission apparatus 101 of the first example is an optical transmission apparatus in which an optical sender (OS) 102 that outputs light to the first port P1 of the first optical device 2 and an optical receiver (OR) 103 that receives light from the third port P3 of the first optical device 2 are provided, for example, in the third example of the optical dispersion compensator of an embodiment, which is shown in FIG. 3. The optical sender 102 is substantially connected to the first adjustment unit 25. The optical receiver 103 is substantially connected to the third port P3.

Figure 8:
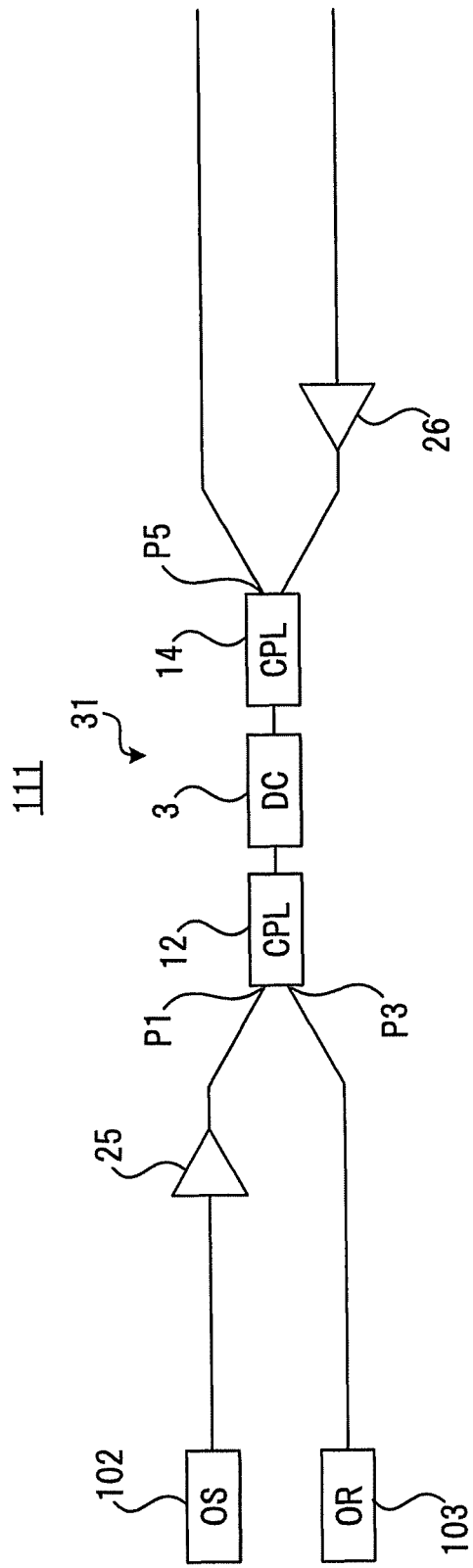
FIG. 8 illustrates a second example of the optical transmission apparatus according to an embodiment.

FIG. 8 illustrates a second example of the optical transmission apparatus according to an embodiment. As shown in FIG. 8, an optical transmission apparatus 111 of the second example is an optical transmission apparatus in which the optical sender 102 and the optical receiver 103 are provided, for example, in the fourth example of the optical dispersion compensator of an embodiment that is shown in FIG. 4, similarly as in the first example of the optical transmission apparatus. In the first example or the second example of the optical transmission apparatus, the wavelength of light outputted from the optical sender 102 may be the same as the wavelength of light inputted to the optical receiver 103.

Figure 9:
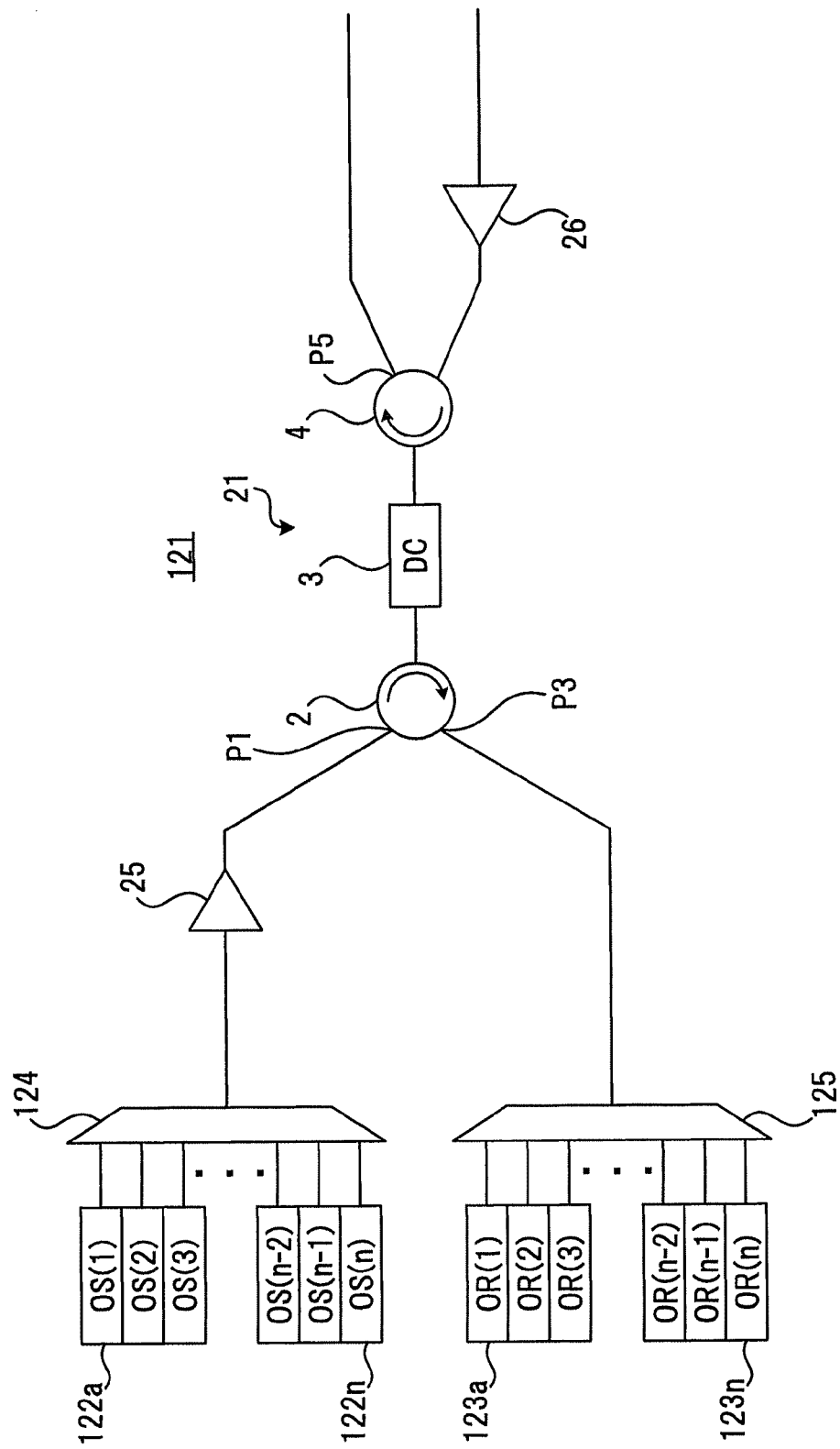
FIG. 9 illustrates a third example of the optical transmission apparatus according to an embodiment.

FIG. 9 illustrates a third example of the optical transmission apparatus according to an embodiment. As shown in FIG. 9, an optical transmission apparatus 121 of the third example is an optical transmission apparatus in which lights from a plurality of optical senders 122a, . . . , and 122n are multiplexed by an optical multiplexer 124 and inputted to the first port P1 of the first optical device 2 in the first example of the optical transmission apparatus shown in FIG. 7. And, in the optical transmission apparatus 121 of the third example, the light from the third port P3 of the first optical device 2 is demultiplexed into a plurality of lights by an optical demultiplexer 125 and inputted to a plurality of optical receivers 123a, . . . , and 123n in the first example of the optical transmission apparatus shown in FIG. 7.

Figure 10:
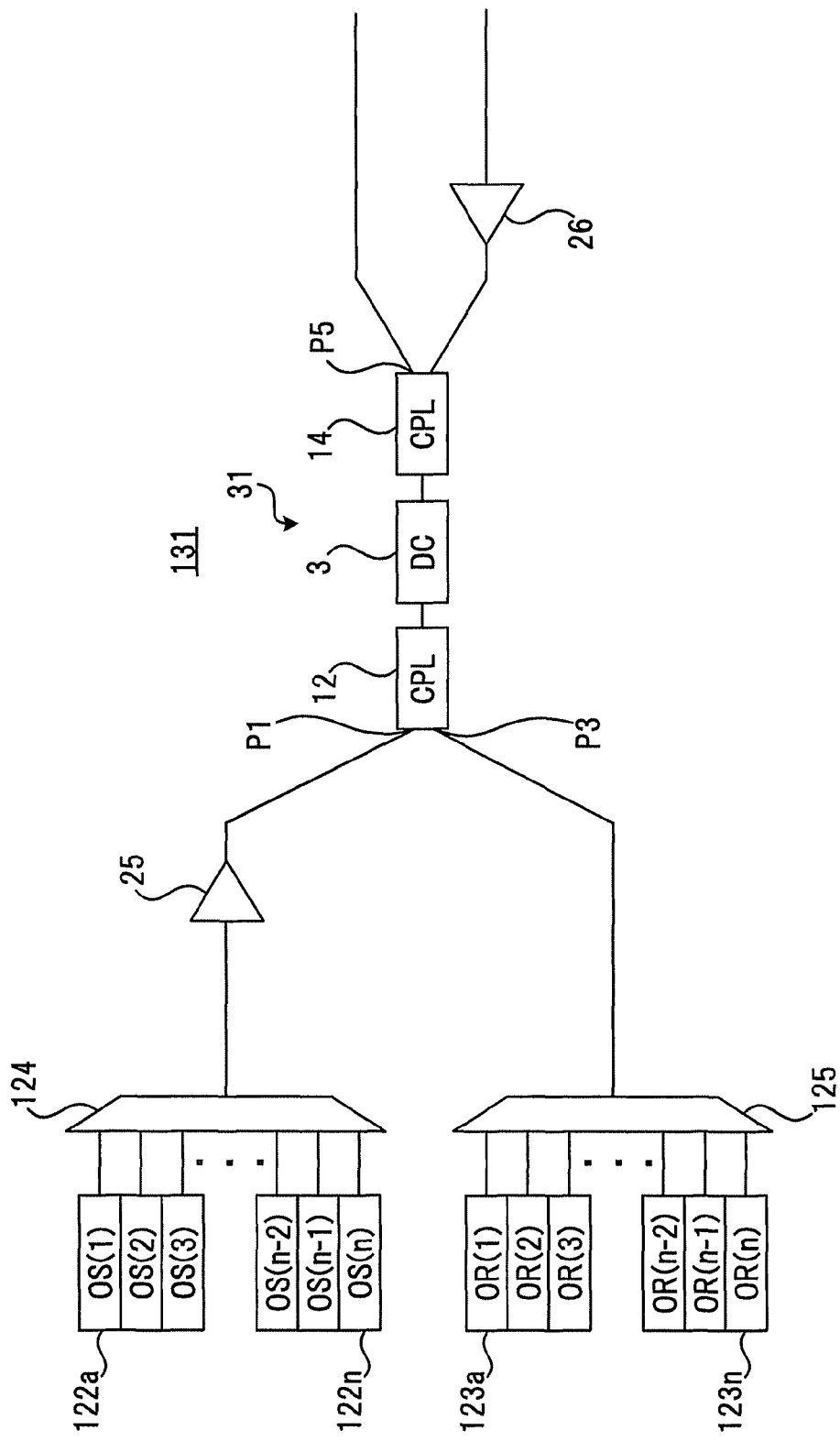
FIG. 10 illustrates a fourth example of the optical transmission apparatus according to an embodiment.

FIG. 10 illustrates a fourth example of the optical transmission apparatus according to an embodiment. As shown in FIG. 10, an optical transmission apparatus 131 of the fourth example is an optical transmission apparatus in which the plurality of optical senders 122a, . . . , and 122n, the optical multiplexer 124, the optical demultiplexer 125, and the plurality of optical receivers 123a, . . . , and 123n are provided in the second example of the optical transmission apparatus shown in FIG. 8, similarly as in the third example of the optical transmission apparatus shown in FIG. 9. In the third example or the fourth example of the optical transmission apparatus, a part or all of the wavelengths of the lights outputted from the plurality of optical senders 122a, . . . , and 122n may be the same as a part or all of the wavelengths of the lights inputted to the plurality of optical receivers 123a, . . . , and 123n. Further, in the third example or the fourth example of the optical transmission apparatus, the optical senders 122a, . . . , and 122n and the optical receivers 123a, . . . , and 123n may not be provided.

It is noted that, in the first example or the third example of the optical transmission apparatus of an embodiment, the first example (see FIG. 1), the second example (see FIG. 2), the fourth example (see FIG. 4), the fifth example (see FIG. 5), or the sixth example (see FIG. 6) of the optical dispersion compensator may be used as an optical dispersion compensator. In the second example or the fourth example of the optical transmission apparatus of an embodiment, the first example (see FIG. 1), the second example (see FIG. 2), the third example (see FIG. 3), the fifth example (see FIG. 5), or the sixth example (see FIG. 6) of the optical dispersion compensator may be used as an optical dispersion compensator. Further, an optical attenuator may be provided between the first optical device 2 or 12 and the optical receiver 103, and an optical attenuator may be substantially connected to the fifth port P5 of the second optical device 4 or 14.

According to an embodiment, in the optical transmission apparatus, wavelength dispersion of the to-be-transmitted light and wavelength dispersion of the to-be-received light may be compensated by the single optical dispersion compensator. Further, because the crosstalk may be sufficiently suppressed, the optical dispersion compensator may be shared for both to-be-received light and to-be-transmitted light, even when the to-be-received light and the to-be-transmitted light have the same wavelength. Therefore, the number of parts necessary is reduced and the optical transmission apparatus becomes inexpensive. Further, the optical transmission apparatus may be reduced in size.

Figure 11:
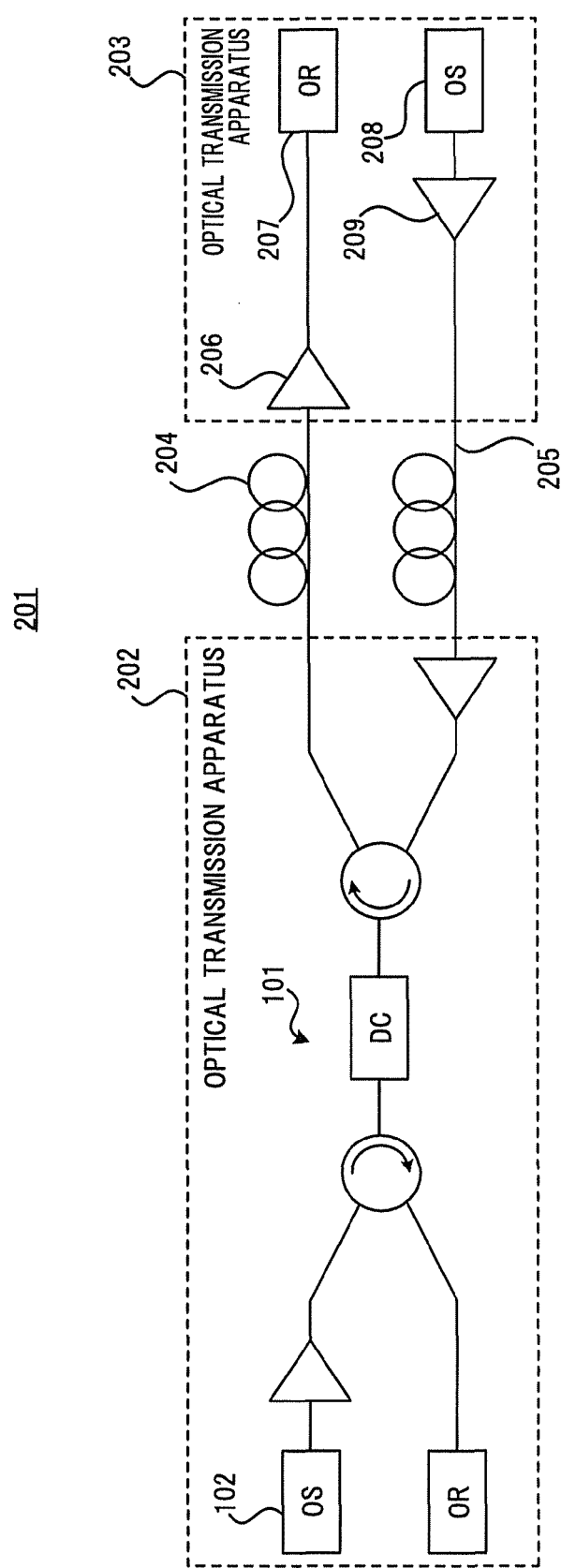
FIG. 11 illustrates a first example of an optical transmission system according to an embodiment.

FIG. 11 illustrates a first example of an optical transmission system according to an embodiment. As shown in FIG. 11, an optical transmission system 201 of the first example includes a first optical transmission apparatus 202, a second optical transmission apparatus 203, a first optical transmission line 204, and a second optical transmission line 205. For example, the first example (see FIG. 7) of the optical transmission apparatus of an embodiment is used as the first optical transmission apparatus 202. In the second optical transmission apparatus 203, for example, an adjustment unit 206, such as an optical amplifier, adjusts the level of light sent from the first optical transmission apparatus 202, and an optical receiver 207 receives the adjusted light. Also, in the second optical transmission apparatus 203, an adjustment unit 209, such as an optical amplifier, adjusts the level of light outputted from an optical sender 208 and outputs the light to the first optical transmission apparatus 202. The first optical transmission line 204 transmits light from the first optical transmission apparatus 202 to the second optical transmission apparatus 203. The second optical transmission line 205 transmits light from the second optical transmission apparatus 203 to the first optical transmission apparatus 202. The wavelength of the light outputted by the optical sender 102 of the first optical transmission apparatus 202 may be the same as the wavelength of the light outputted by the optical sender 208 of the second optical transmission apparatus 203.

Figure 12:
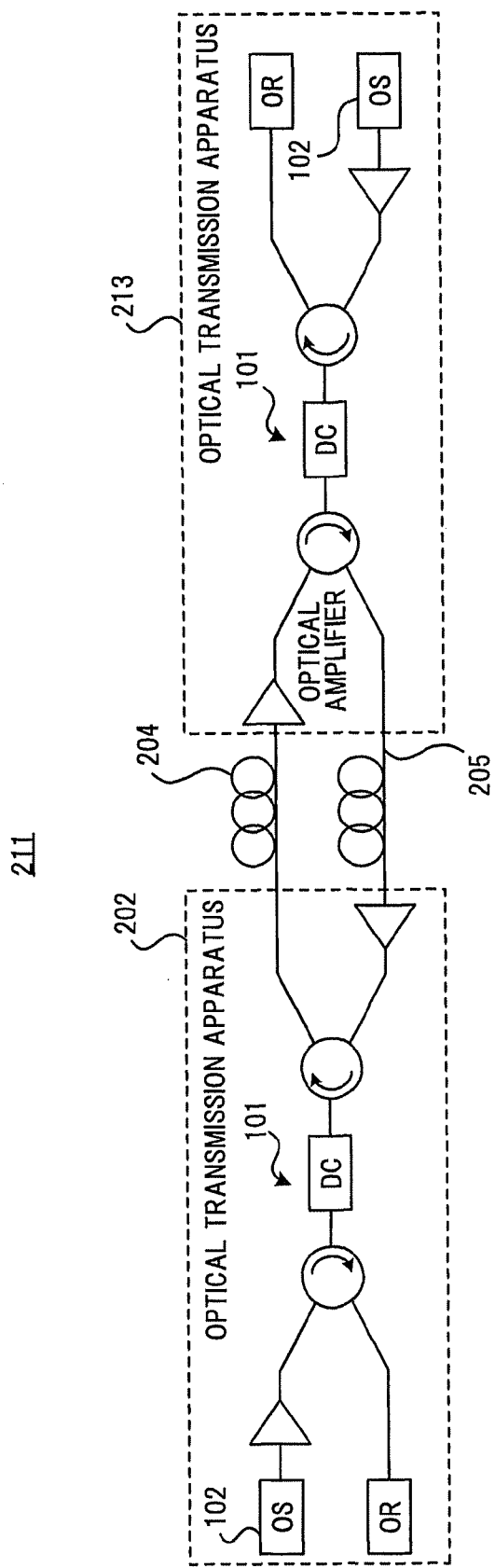
FIG. 12 illustrates a second example of the optical transmission system according to an embodiment.

FIG. 12 illustrates a second example of the optical transmission system according to an embodiment. As shown in FIG. 12, an optical transmission system 211 of the second example is an optical transmission system in which, for example, the first example (see FIG. 7) of the optical transmission apparatus of an embodiment is used as a second optical transmission apparatus 213 in the first example of the optical transmission system.

Figure 13:
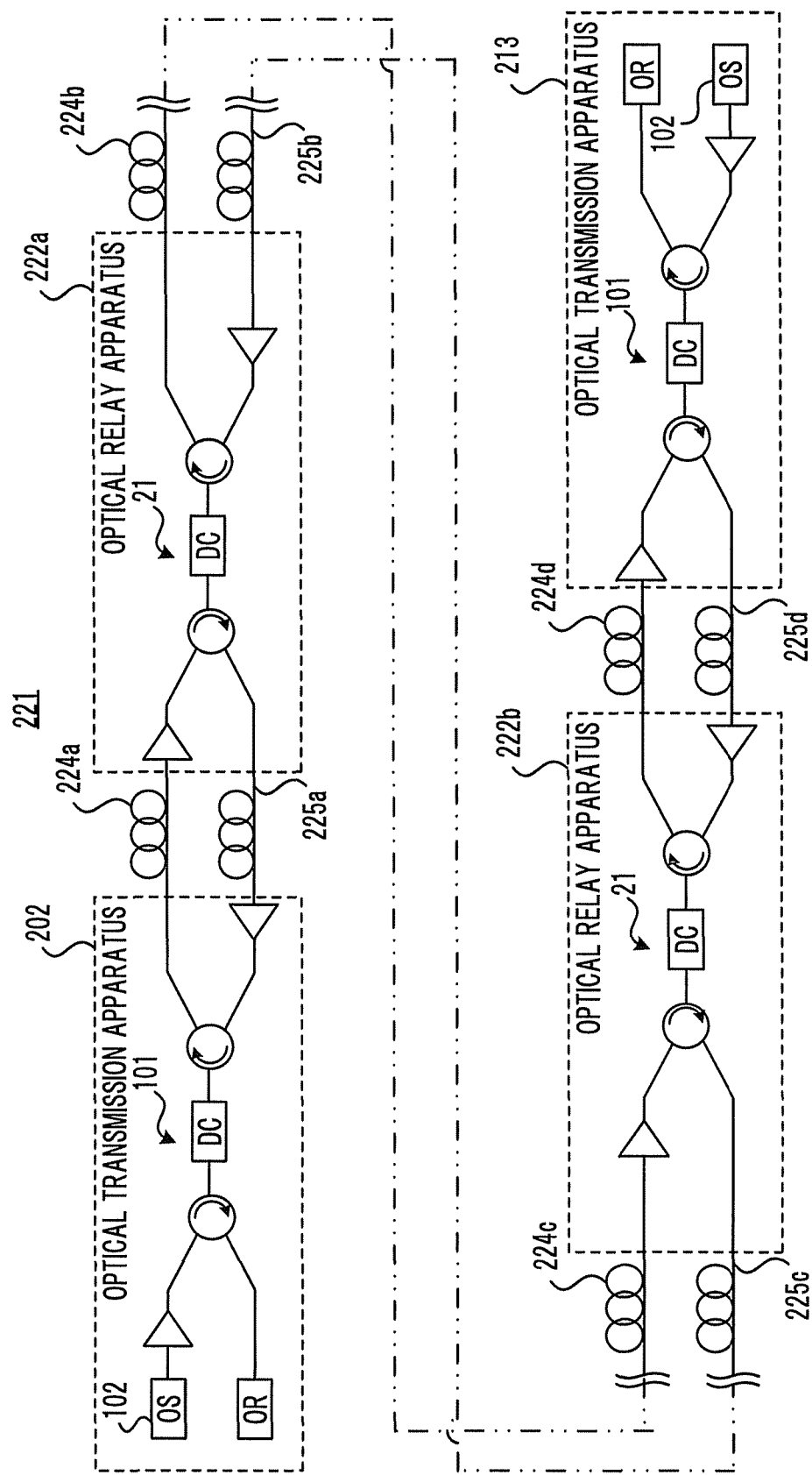
FIG. 13 illustrates a third example of the optical transmission system according to an embodiment.

FIG. 13 illustrates a third example of the optical transmission system according to an embodiment. As shown in FIG. 13, an optical transmission system 221 of the third example is an optical transmission system in which one or more optical relay apparatuses 222a and 222b are provided on first optical transmission lines 224a, 224b, 224c, and 224d and second optical transmission lines 225a, 225b, 225c, and 225d between the first optical transmission apparatus 202 and the second optical transmission apparatus 213 in the second example of the optical transmission system. It is noted that the two optical relay apparatuses are shown in the example of FIG. 13, but the number of the optical relay apparatuses may be 1 or may be 3 or more. For example, the third example (see FIG. 3) of the optical dispersion compensator is used as the optical relay apparatuses 222a and 222b. The first example (see FIG. 1), the second example (see FIG. 2), the fourth example (see FIG. 4), the fifth example (see FIG. 5), or the sixth example (see FIG. 6) of the optical dispersion compensator of the above-described embodiment may be used as an optical dispersion compensator. Further, the second optical transmission apparatus 213 may have the same configuration as that of the first example (see FIG. 11) of the optical transmission system.

In the third example of the optical transmission system, the crosstalk of each of the first optical transmission apparatus 202, the optical relay apparatuses 222a and 222b, and the second optical transmission apparatus 213 is Qp_i. i is an integer that is not less than 1 and not more than m. m is the sum of: the number of terminal stations at both ends of the optical transmission system; and the number of relay stations therebetween. The crosstalk Qp of the entire optical transmission system is obtained by the following formula (9).

$$Qp = 10 \cdot \log(10^{(Qp\_1/10)} + 10^{(Qp\_2/10)} + \ldots + 10^{(Qp\_(m-1)/10)} + 10^{(Qp\_m/10)}) \quad (9)$$

In the formula (9), for example, when $Qp\_1, Qp\_2, \ldots, Qp\_(m-1)$, and $Qp\_m$ are −38.2 dB as calculated by the above formulas (3) and (4), m is 20 in order to prevent the coherent crosstalk from exceeding −25 dB. In other words, the optical transmission system may be constituted of the terminal stations at the both ends and the relay stations therebetween, the sum of the numbers of which is 20.

In the second example or the third example of the optical transmission system, the wavelength of the light outputted by the optical sender 102 of the first optical transmission apparatus 202 may be the same as the wavelength of the light outputted by the optical sender 102 of the second optical transmission apparatus 213. Further, in the first example, the second example, or the third example of the optical transmission system, for example, the second example (see FIG. 8) of the optical transmission apparatus may be used as the first optical transmission apparatus 202 or the second optical transmission apparatus 213. Further, wavelength dispersion may be compensated in all of the first optical transmission apparatus 202, the optical relay apparatuses 222a and 222b, and the second optical transmission apparatus 213, or there may be one or more apparatuses in which wavelength dispersion is not compensated.

Figure 14:
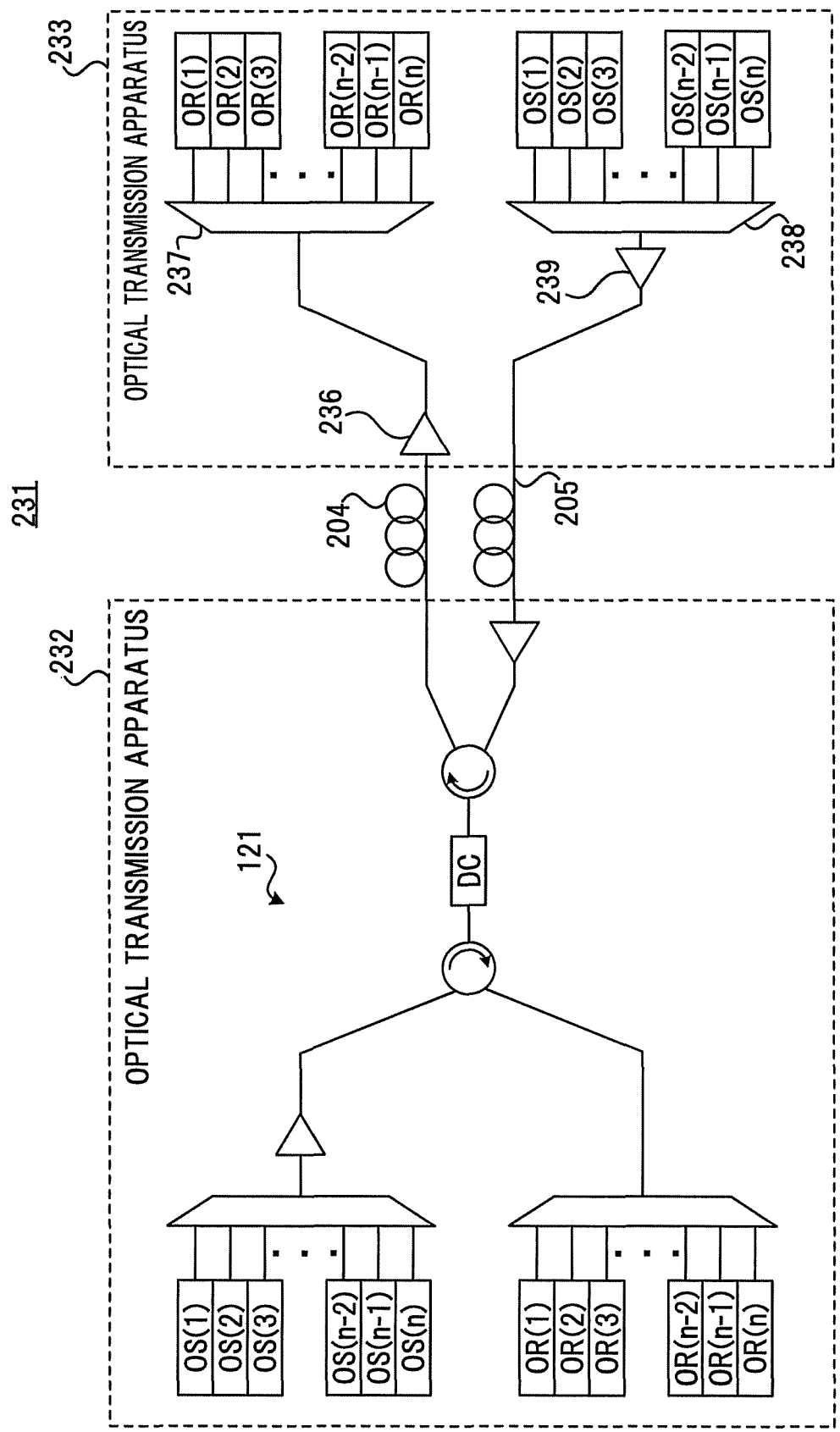
FIG. 14 illustrates a fourth example of the optical transmission system according to an embodiment.

FIG. 14 illustrates a fourth example of the optical transmission system according to an embodiment. As shown in FIG. 14, an optical transmission system 231 of the fourth example is an optical transmission system in which, for example, the third example (see FIG. 9) of the optical transmission apparatus of the above-described embodiment is used as a first optical transmission apparatus 232 in the first example of the optical transmission system. In a second optical transmission apparatus 233, for example, an adjustment unit 236, such as an optical amplifier, adjusts the level of light sent from the first optical transmission apparatus 232, and an optical demultiplexer 237 demultiplexes the light, and a plurality of optical receivers receives the resultant lights. Also, in the second optical transmission apparatus 233, an optical multiplexer 238 multiplexes lights outputted from a plurality of optical senders, and an adjustment unit 239, such as an optical amplifier, adjusts the level of the multiplexed light and outputs the multiplexed light to the first optical transmission apparatus 232.

Figure 15:
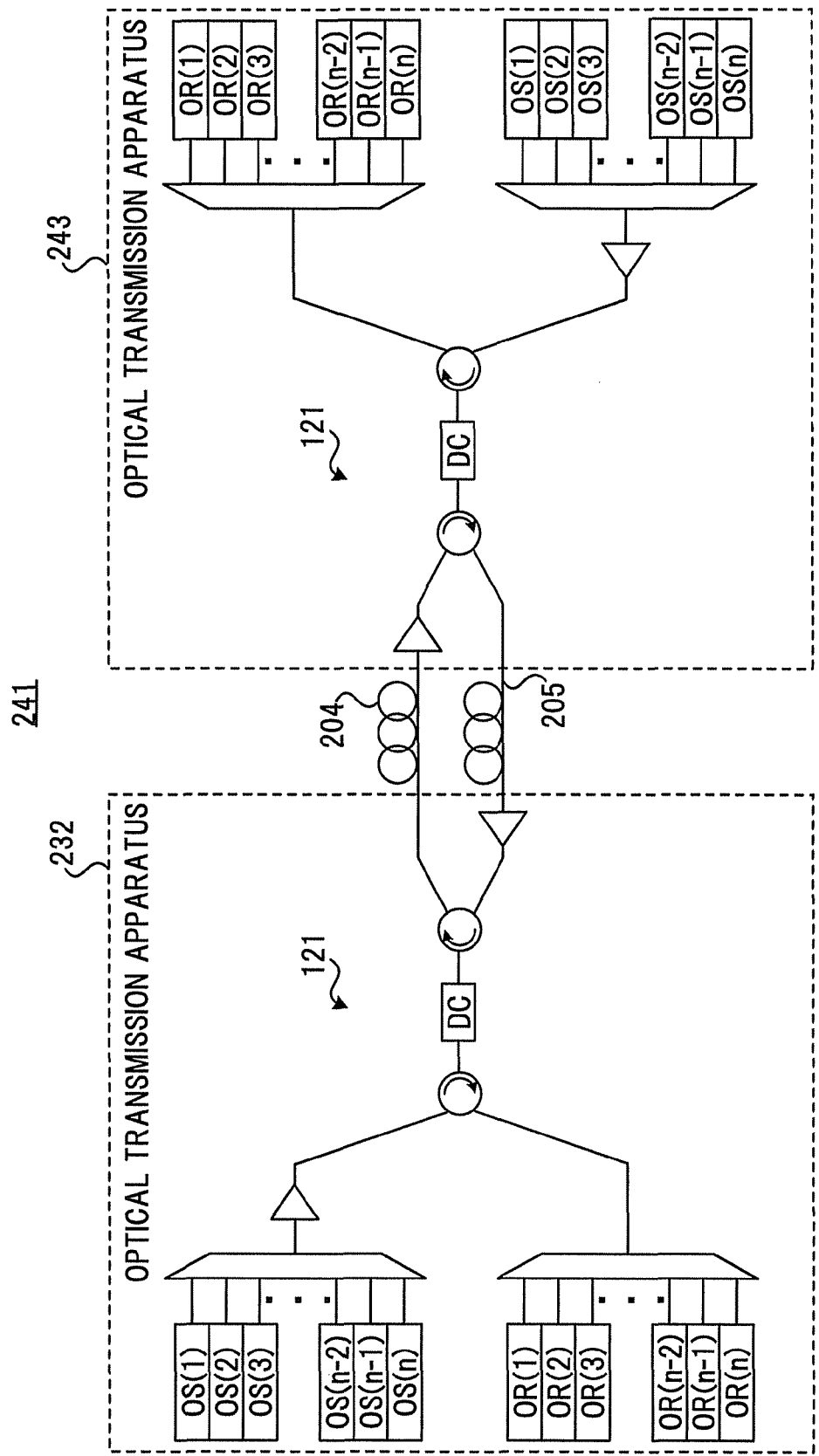
FIG. 15 illustrates a fifth example of the optical transmission system according to an embodiment.

FIG. 15 illustrates a fifth example of the optical transmission system according to an embodiment. As shown in FIG. 15, an optical transmission system 241 of the fifth example is an optical transmission system in which, for example, the third example (see FIG. 9) of the optical transmission apparatus is used as a second optical transmission apparatus 243 in the fourth example of the optical transmission system.

Figure 16:
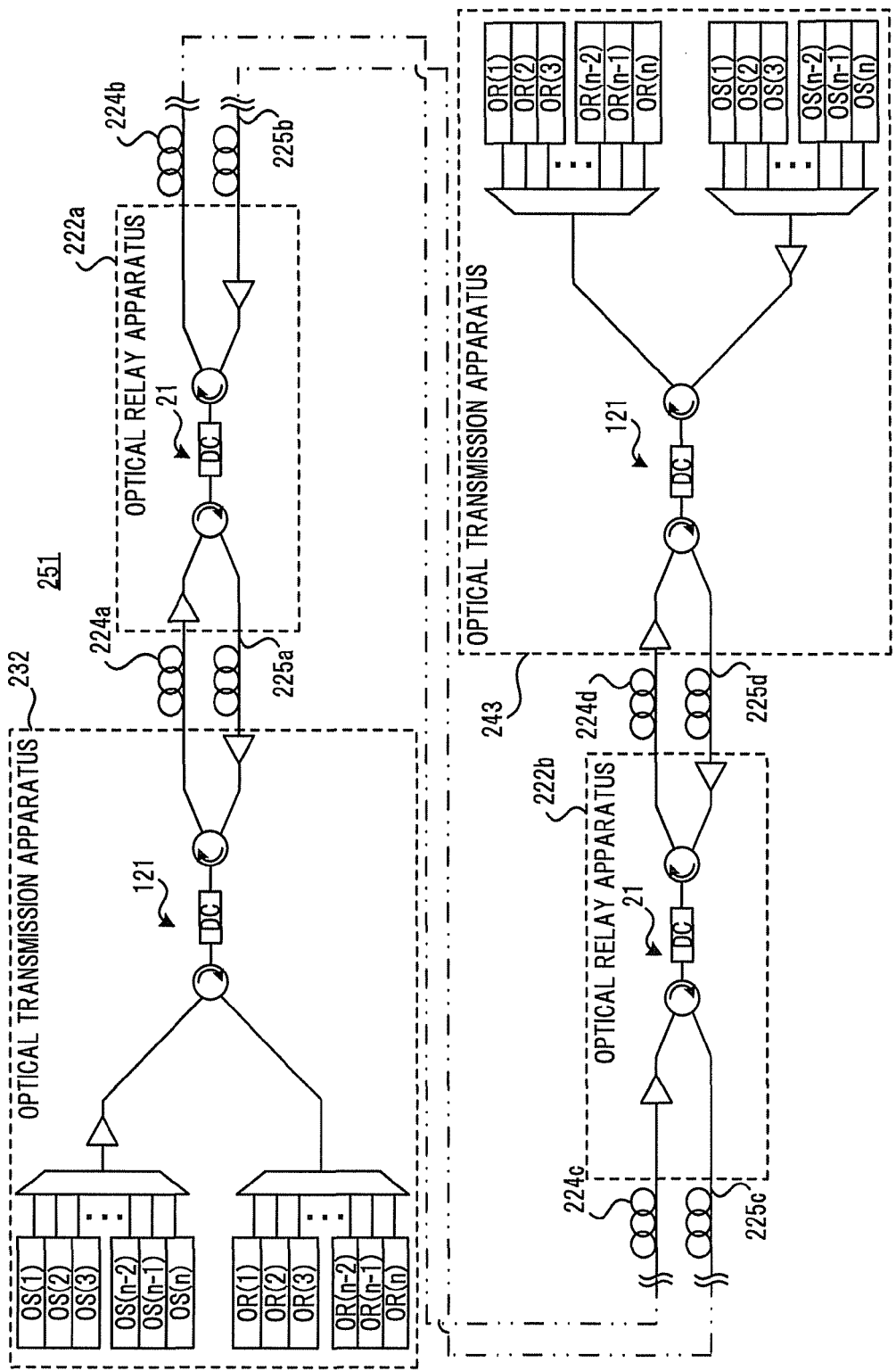
FIG. 16 illustrates a sixth example of the optical transmission system according to an embodiment.

FIG. 16 illustrates a sixth example of the optical transmission system according to an embodiment. As shown in FIG. 16, an optical transmission system 251 of the sixth example is an optical transmission system in which the one or more optical relay apparatuses 222a and 222b are provided in the fifth example of the optical transmission system, similarly as in the third example of the optical transmission system. The number of the optical relay apparatuses may be 1 or may be 3 or more.

In the fourth example, the fifth example, or the sixth example of the optical transmission system, a part or all of the wavelengths of the lights outputted from the plurality of optical senders of the first optical transmission apparatus 232 may be the same as a part or all of the wavelengths of the lights inputted to the plurality of optical receivers of the second optical transmission apparatus 233 or 243. Further, for example, the fourth example (see FIG. 10) of the optical transmission apparatus of the above-described embodiment may be used as the first optical transmission apparatus 232 or the second optical transmission apparatus 243.

According to an embodiment, in the optical transmission apparatus or the optical relay apparatus of the optical transmission system, wavelength dispersion of lights in the opposite directions may be compensated by the single optical dispersion compensator. Further, because the crosstalk may be sufficiently suppressed, the optical dispersion compensator may be shared for the opposite directions, even when the lights in the opposite directions have the same wavelength. Therefore, the number of parts is reduced and the optical transmission system becomes inexpensive.

A method of controlling an optical compensator, including determining a wavelength dispersion with respect to a light in an upstream direction and a light in a downstream direction and compensating the wavelength dispersion with respect to the upstream direction and the downstream direction by a single optical dispersion compensator.

It is noted that the above-described embodiments may be modified including as follows. For example, an optical device other than an optical circulator and an optical coupler may be used as the first optical device and the second optical device as long as an optical path that is the path A and an optical path that is the path B may be provided and the level of the return light may be suppressed to a level that does not have an adverse effect on the signal quality of the light that should be outputted. Further, an optical device other than an etalon type dispersion compensator may be used as the optical filter type dispersion compensation device as long as it has a characteristic of having a low loss and low reflection.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. An optical dispersion compensator, comprising:
    a first optical device in which light inputted from a first port is outputted from a second port and light inputted from the second port is outputted from a third port;
    an etalon filter type dispersion compensation device that receives light from the second port of the first optical device and compensates wavelength dispersion with respect to the received light; and
    a second optical device that includes a fourth port which receives light compensated by the etalon filter type dispersion compensation device, where the light inputted-outputted from a fifth port to the fourth port is adjusted to maintain a level of predetermined signal quality of light outputted from a sixth port to the fourth port.

2. The optical dispersion compensator according to claim 1, wherein each of the first optical device and the second optical device is an optical circulator.

3. The optical dispersion compensator according to claim 1, wherein each of the first optical device and the second optical device is an optical coupler.

4. The optical dispersion compensator according to claim 1, comprising:
    an adjustment unit that adjusts an input level of the light inputted to the etalon filter type dispersion compensation device.

5. The optical dispersion compensator according to claim 4, wherein the adjustment unit is an optical amplifier.

6. The optical dispersion compensator according to claim 4, wherein the adjustment unit is an optical attenuator.

7. An optical transmission apparatus, comprising:
    a first optical device in which light inputted from a first port is outputted from a second port and light inputted from the second port is outputted from a third port;
    an etalon filter type dispersion compensation device that receives light from the second port of the first optical device and compensates wavelength dispersion with respect to the received light;
    a second optical device that includes a fourth port which receives light compensated by the etalon filter type dispersion compensation device, where the light outputted from a fifth port to the fourth port is adjusted to maintain a level of predetermined signal quality of light outputted from a sixth port is to the fourth port;
    an optical sender that outputs light to the first port of the first optical device; and
    an optical receiver that receives light from the third port of the first optical device.

8. The optical transmission apparatus according to claim 7, wherein a wavelength of the light outputted from the optical sender is the same as a wavelength of the light inputted to the optical receiver.

9. The optical transmission apparatus according to claim 7, wherein each of the first optical device and the second optical device is an optical circulator.

10. The optical transmission apparatus according to claim 7, wherein each of the first optical device and the second optical device is an optical coupler.

11. The optical transmission apparatus according to claim 7, further comprising:
    an adjustment unit that adjusts an input level of the light inputted to the etalon filter type dispersion compensation device.

12. The optical transmission apparatus according to claim 11, wherein the adjustment unit is an optical amplifier.

13. The optical transmission apparatus according to claim 11, wherein the adjustment unit is an optical attenuator.

14. An optical transmission system, comprising:
    a first optical transmission apparatus that outputs light;
    a second optical transmission apparatus that outputs light having a wavelength that is the same as a wavelength of the light outputted from the first optical transmission apparatus;

a first optical transmission line that transmits the light outputted from the first optical transmission apparatus, to the second optical transmission apparatus; and a second optical transmission line that transmits the light outputted from the second optical transmission apparatus, to the first optical transmission apparatus, and wherein the first optical transmission apparatus or the second optical transmission apparatus, or each of the first optical transmission apparatus and the second optical transmission apparatus includes:

a first optical device in which light inputted from a first port is outputted from a second port and light inputted from the second port is outputted from a third port;

an etalon filter type dispersion compensation device that receives light from the second port of the first optical device and compensates wavelength dispersion with respect to the received light;

a second optical device that includes a fourth port which receives light compensated by the etalon filter type dispersion compensation device, where the light outputted from a fifth port to the fourth port is adjusted to maintain a level of predetermined signal quality of light outputted from a sixth port to the fourth port;

an optical sender that outputs light to the first port of the first optical device; and an optical receiver that receives light from the third port of the first optical device.

15. The optical transmission apparatus according to claim 14, comprising:

one or more optical relay apparatuses on the first optical transmission line and the second optical transmission line, and wherein each of the one or more optical relay apparatuses includes the first optical device, the etalon filter type dispersion compensation device, and the second optical device.

16. The optical transmission apparatus according to claim 14, wherein each of the first optical device and the second optical device is an optical circulator.

17. An optical dispersion compensator, comprising:

at least one optical device; and where the optical dispersion compensator executes an operation including:

determining a wavelength dispersion with respect to a light in an upstream direction and a light in a downstream direction; and compensating the wavelength dispersion with respect to the upstream direction and the downstream direction by a single optical dispersion compensator, and where said compensating includes adjusting one of light in the upstream direction and the downstream direction to maintain a level of predetermined signal quality.

18. An optical dispersion compensator, comprising:

a first optical device in which light inputted from a first port is outputted from a second port and light inputted from the second port is outputted from a third port;

an etalon filter type dispersion compensation device that receives light from the second port of the first optical device and compensates wavelength dispersion with respect to the received light; and a second optical device that includes a fourth port to which light is inputted from the etalon filter type dispersion compensation device, and in which the light outputted from a fifth port to the fourth port is adjusted to maintain a level of predetermined signal quality of light outputted from a sixth port to the fourth port, and wherein the etalon filter type dispersion compensation device is configured to compensate light to be received having a wavelength that is the same as light to be transmitted.

19. An optical dispersion compensator, comprising:

at least one optical device; and where the optical dispersion compensator executes an operation including:

determining a wavelength dispersion with respect to a light in an upstream direction and a light in a downstream direction; and compensating the wavelength dispersion with respect to the upstream direction and the downstream direction by a single optical dispersion compensator, and wherein an etalon filter type dispersion compensation device is configured to compensate light to be received having a wavelength that is the same as light to be transmitted, and said compensating includes adjusting one of light in the upstream direction and the downstream direction to maintain a level of predetermined signal quality.

* * * * *

UNITED STATES PATENT AND TRADEMARK OFFICE
CERTIFICATE OF CORRECTION

PATENT NO. : 8,442,404 B2
APPLICATION NO. : 12/730698
DATED : May 14, 2013
INVENTOR(S) : Hiroshi Ogiwara Page 1 of 1

It is certified that error appears in the above-identified patent and that said Letters Patent is hereby corrected as shown below:

In the Claims:

Column 12, Line 5, In Claim 1, after "light" delete "inputted-".

Signed and Sealed this
Twenty-seventh Day of August, 2013

Teresa Stanek Rea
*Acting Director of the United States Patent and Trademark Office*